US009579241B2

(12) United States Patent
Spoor et al.

(10) Patent No.: US 9,579,241 B2
(45) Date of Patent: Feb. 28, 2017

(54) SUPPORT ARRANGEMENT WITH ACTIVATION MECHANISM

(71) Applicant: Steelcase Inc., Grand Rapids, MI (US)

(72) Inventors: Travis Spoor, Ada, MI (US); Gary Karsten, Wyoming, MI (US); David John Dekker, Holland, MI (US); Jeffrey David Simon, Portland, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 14/872,724

(22) Filed: Oct. 1, 2015

(65) Prior Publication Data

US 2016/0022513 A1 Jan. 28, 2016

Related U.S. Application Data

(63) Continuation-in-part of application No. 14/736,368, filed on Jun. 11, 2015, which is a continuation of
(Continued)

(51) Int. Cl.
A61G 1/04 (2006.01)
F16D 65/28 (2006.01)
(Continued)

(52) U.S. Cl.
CPC ............. A61G 1/04 (2013.01); A61G 1/0287 (2013.01); A61G 5/101 (2013.01); A61G 5/1037 (2013.01);
(Continued)

(58) Field of Classification Search
CPC ........ B60T 33/092; B60T 33/81; B60T 33/78; B60T 11/046; B60T 7/045; B62B 5/0433;
(Continued)

(56) References Cited

U.S. PATENT DOCUMENTS 934,480 A 9/1909 Treiber
2,042,489 A 6/1936 Williams
(Continued)

FOREIGN PATENT DOCUMENTS

EP 422376 A1 4/1991
EP 187197 A1 1/2009
(Continued)

OTHER PUBLICATIONS

Electronic Translation of DE 29720134 U1.*

Primary Examiner — Anna Momper
(74) Attorney, Agent, or Firm — Price Heneveld LLP

(57) ABSTRACT

A support arrangement having an activation mechanism to control the movement of wheels is provided. The support arrangement includes a platform, a chassis attached to the platform, a pair of wheel assemblies movably coupled to the chassis, and the activation mechanism. The pair of wheel assemblies are operable between a first state and a second state. The activation mechanism includes a track having a first stable position and a second stable position spaced along a length of the track, and a pin configured to travel along the track. Wheels are in the first state when the pin is in the first stable position and are in the second state when the pin is in the second stable position.

23 Claims, 15 Drawing Sheets

Related U.S. Application Data application No. 13/650,255, filed on Oct. 12, 2012, now Pat. No. 9,074,648.

(51) Int. Cl.

| | | |
|---|---|---|
| *B62B 5/04* | (2006.01) | |
| *A61G 1/02* | (2006.01) | |
| *A61G 5/10* | (2006.01) | |
| *B62B 9/08* | (2006.01) | |
| *B60B 33/00* | (2006.01) | |
| *B60T 11/04* | (2006.01) | |
| *F16D 125/60* | (2012.01) | |
| *A61G 7/08* | (2006.01) | |

(52) U.S. Cl.
CPC .......... *A61G 5/1051* (2016.11); *A61G 7/0528* (2016.11); *B60B 33/0078* (2013.01); *B60T 11/046* (2013.01); *B62B 5/0433* (2013.01); *B62B 5/0457* (2013.01); *B62B 9/082* (2013.01); *B62B 9/087* (2013.01); *F16D 65/28* (2013.01); *A61G 7/08* (2013.01); *F16D 2125/60* (2013.01)

(58) Field of Classification Search
CPC ..... B62B 5/0457; B62B 5/0461; B62B 9/087; F16D 65/28; F16D 2125/60; F16D 2125/62; A61G 1/0287; A61G 2007/0528; A61G 5/101; A61G 5/1037; B60B 33/066
USPC .... 70/192, 193, 225, 228; 74/512, 524, 539; 5/600, 86.1; 188/2 D, 2 F
See application file for complete search history.

(56) References Cited

U.S. PATENT DOCUMENTS

| | | | |
|---|---|---|---|
| 2,563,919 A | 8/1951 | Christensen | |
| 2,599,717 A | 6/1952 | Menzies | |
| 2,671,354 A | 3/1954 | Goos | |
| 2,684,734 A | 7/1954 | Wilson | |
| 2,812,189 A | 11/1957 | Eduard | |
| 2,908,031 A | 10/1959 | Millett et al. | |
| 2,935,331 A | 5/1960 | Ledgerwood | |
| 2,946,237 A | 7/1960 | Hebert | |
| 2,975,468 A | 3/1961 | Mcclellan | |
| 3,156,493 A | 11/1964 | Griffiths | |
| 3,304,116 A | 2/1967 | Stryker | |
| 3,409,105 A | 11/1968 | Clinton | |
| 3,411,376 A | 11/1968 | Klaus et al. | |
| 3,571,842 A | 3/1971 | Fricke | |
| 3,633,242 A | 1/1972 | Wasofsky | |
| 3,635,491 A | 1/1972 | Drews et al. | |
| 3,890,669 A | 6/1975 | Reinhards | |
| 3,911,525 A | 10/1975 | Haussels | |
| 4,149,433 A | 4/1979 | Schroter | |
| 4,248,444 A | 2/1981 | Johnson | |
| 4,276,962 A | 7/1981 | Aulik | |
| 4,414,702 A | 11/1983 | Neuman | |
| 4,417,648 A | 11/1983 | Anderson et al. | |
| 4,439,879 A | 4/1984 | Werner | |
| 4,479,566 A | 10/1984 | Ishii | |
| 4,526,253 A | 7/1985 | Schmidt | |
| 4,641,545 A | 2/1987 | Rabe | |
| 4,722,114 A | 2/1988 | Neumann | |
| 4,793,207 A | 12/1988 | Old | |
| 4,793,445 A | 12/1988 | Collignon et al. | |
| 4,815,161 A | 3/1989 | Timmer et al. | |
| 4,922,574 A | 5/1990 | Heiligenthal et al. | |
| 5,033,757 A | 7/1991 | Lloyd | |
| 5,133,106 A | 7/1992 | Milbredt et al. | |
| 5,139,116 A | 8/1992 | Screen | |
| 5,144,369 A | 9/1992 | Benedict et al. | |
| 5,181,587 A | 1/1993 | Masatoshi | |
| 5,205,381 A | 4/1993 | Mehmen | |
| 5,232,071 A | 8/1993 | Kawanabe | |
| 5,244,062 A | 9/1993 | Felton | |
| 5,303,450 A | 4/1994 | Lange | |
| 5,348,326 A | 9/1994 | Fullenkamp et al. | |
| 5,368,133 A | 11/1994 | Yang | |
| 5,377,372 A | 1/1995 | Rudolf et al. | |
| 5,474,311 A | 12/1995 | Tyciak et al. | |
| 5,509,506 A | 4/1996 | Jones | |
| 5,579,871 A | 12/1996 | Emmrich et al. | |
| 5,634,532 A | 6/1997 | Bucher | |
| 5,675,864 A | 10/1997 | Chou | |
| 5,806,111 A * | 9/1998 | Heimbrock | A61G 1/0243 280/47.371 |
| 5,832,784 A | 11/1998 | McCallips et al. | |
| 5,845,954 A | 12/1998 | DePue | |
| 5,913,942 A | 6/1999 | Roehling | |
| 5,979,917 A | 11/1999 | Thogersen et al. | |
| 5,987,671 A | 11/1999 | Heimbrock et al. | |
| 6,016,580 A | 1/2000 | Heimbrock et al. | |
| 6,035,975 A * | 3/2000 | Loewenthal | A61G 5/1018 188/2 F |
| 6,047,609 A | 4/2000 | Brower et al. | |
| 6,073,951 A | 6/2000 | Jindra et al. | |
| 6,089,593 A | 7/2000 | Hanson et al. | |
| 6,256,812 B1 * | 7/2001 | Bartow | A61G 7/00 280/43.17 |
| 6,286,165 B1 | 9/2001 | Heimbrock et al. | |
| 6,286,183 B1 | 9/2001 | Stickel et al. | |
| 6,315,319 B1 | 11/2001 | Hanson et al. | |
| 6,409,187 B1 | 6/2002 | Crow, Jr. | |
| 6,421,854 B1 | 7/2002 | Heimbrock | |
| 6,491,086 B2 | 12/2002 | Bettio et al. | |
| 6,505,359 B2 | 1/2003 | Heimbrock et al. | |
| 6,565,112 B2 | 5/2003 | Hanson et al. | |
| 6,575,052 B2 | 6/2003 | Toennesland et al. | |
| 6,584,641 B1 | 7/2003 | Milbredt | |
| 6,598,247 B1 | 7/2003 | Heimbrock et al. | |
| 6,669,250 B1 | 12/2003 | St. Louis | |
| 6,725,956 B1 | 4/2004 | Lemire | |
| 6,726,279 B1 | 4/2004 | Figel et al. | |
| 6,752,224 B2 | 6/2004 | Hopper et al. | |
| 6,792,630 B1 | 9/2004 | Palmatier et al. | |
| 6,810,560 B1 | 11/2004 | Tsai | |
| 6,820,294 B2 * | 11/2004 | Shiery | A61G 7/00 5/11 |
| 6,846,042 B2 | 1/2005 | Hanson et al. | |
| 6,871,909 B2 | 3/2005 | Hobb et al. | |
| 7,059,452 B2 | 6/2006 | Chen | |
| 7,062,805 B2 | 6/2006 | Hopper et al. | |
| 7,175,002 B2 | 2/2007 | Chiang | |
| 7,198,279 B2 | 4/2007 | Montalvo | |
| 7,302,717 B2 | 12/2007 | Reinke et al. | |
| 7,346,942 B2 | 3/2008 | Reinke et al. | |
| 7,367,432 B2 | 5/2008 | Chen | |
| 7,406,745 B2 | 8/2008 | Chou | |
| 7,480,948 B2 | 1/2009 | Reinke et al. | |
| 7,698,760 B2 | 4/2010 | Reckelhoff et al. | |
| 7,708,119 B2 | 5/2010 | Chen | |
| 7,810,613 B2 | 10/2010 | Lin | |
| 7,810,822 B2 | 10/2010 | Figel et al. | |
| 7,922,182 B2 | 4/2011 | Van der Vegt | |
| 7,922,183 B2 | 4/2011 | Figel et al. | |
| 8,016,301 B2 | 9/2011 | Figel et al. | |
| 8,109,525 B2 | 2/2012 | Salus | |
| 8,122,535 B2 | 2/2012 | Hensley et al. | |
| 8,292,327 B2 | 10/2012 | Araya Moreno et al. | |
| 8,511,693 B2 | 8/2013 | Gass et al. | |
| 8,516,656 B2 | 8/2013 | Lin et al. | |
| 8,640,832 B2 | 2/2014 | Chen et al. | |
| 8,657,246 B2 | 2/2014 | Ma | |
| 8,667,628 B1 | 3/2014 | Heikkila | |
| 8,746,710 B2 | 6/2014 | Schejbal | |
| 8,781,677 B2 | 7/2014 | Roberts et al. | |
| 8,910,953 B2 | 12/2014 | Faulhaber | |
| 8,944,441 B2 | 2/2015 | Araya Moreno | |
| 8,960,625 B2 | 2/2015 | Ma | |
| 9,301,895 B2 * | 4/2016 | Hough | A61G 5/14 |
| 9,351,890 B2 * | 5/2016 | Hough | A61G 5/14 |
| 2002/0066332 A1 | 6/2002 | Horikawa | |

(56) References Cited

U.S. PATENT DOCUMENTS

| | | |
|---|---|---|
| 2007/0056141 A1 | 3/2007 | Armano et al. |
| 2007/0144303 A1 | 6/2007 | Sato et al. |
| 2011/0225733 A1 | 9/2011 | Figel et al. |
| 2012/0104712 A1 | 5/2012 | Kobayashi |
| 2012/0198620 A1 | 8/2012 | Hornbach et al. |
| 2013/0320641 A1 | 12/2013 | Zhang |
| 2014/0083803 A1 | 3/2014 | Chen et al. |
| 2014/0102834 A1 | 4/2014 | Spoor |
| 2014/0230149 A1 | 8/2014 | Schejbal |
| 2014/0265502 A1 | 9/2014 | Hough et al. |

FOREIGN PATENT DOCUMENTS

| | | | |
|---|---|---|---|
| JP | 04213679 A | 8/1992 | |
| JP | 2009286370 A | 12/2009 | |
| JP | 2010143290 A | 7/2010 | |
| TW | DE 29720134 U1 * | 1/1998 | ................ B60T 7/04 |

\* cited by examiner

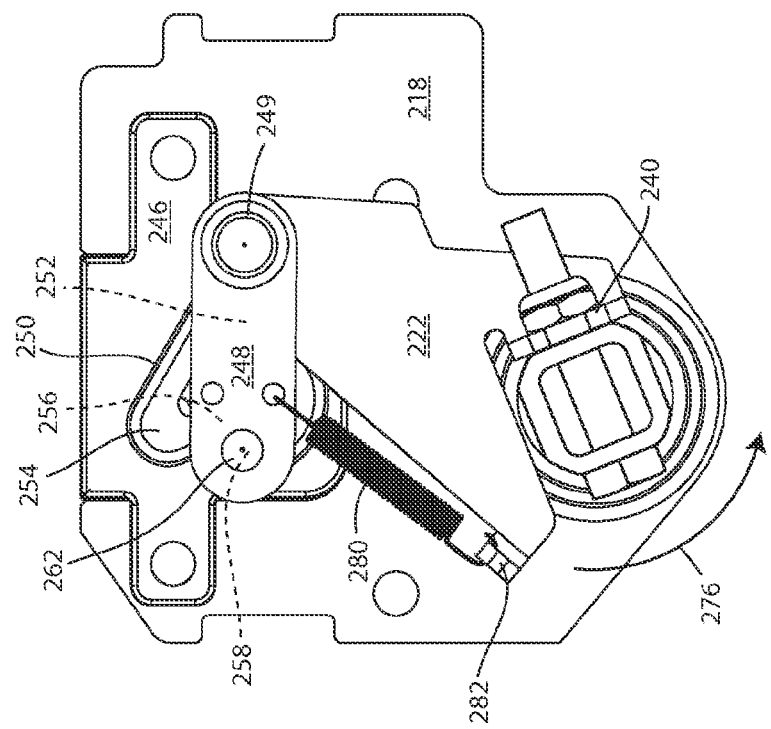
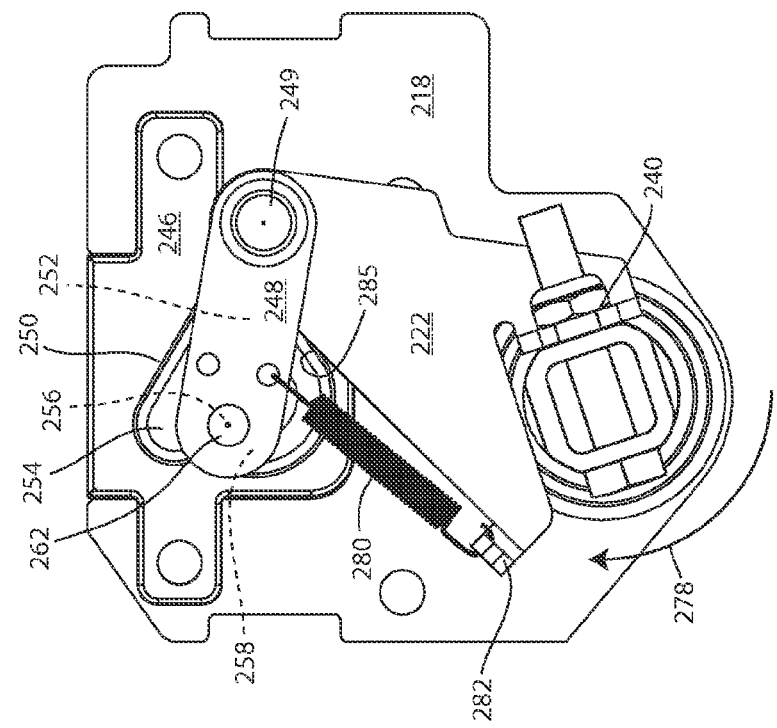

SUPPORT ARRANGEMENT WITH ACTIVATION MECHANISM

CROSS-REFERENCE TO RELATED APPLICATIONS

This application is a continuation-in-part of pending U.S. patent application Ser. No. 14/736,368, which was filed on Jun. 19, 2015 and entitled Support Arrangement with Activation Mechanism, which is a continuation of U.S. patent application Ser. No. 13/650,255, which was filed Oct. 12, 2012 and entitled Braking Mechanism, now U.S. Pat. No. 9,074,648, the entire disclosures of which are hereby incorporated herein by reference.

TECHNICAL FIELD

Various embodiments relate to a support arrangement with an activations mechanism, more particularly, to an activation mechanism for braking arrangements and steering arrangements for movable furniture, such as chairs, beds, tables and the like. Although the following discussion relates to movable chairs, the various embodiments extend to all pieces of movable furniture on wheels.

Wheels are used on movable furniture, such as chairs, to allow for easy movement of the chair even while a person is seated in it. It is often desired to lock the wheels to secure the movable furniture when it is not being moved by a user. For example, a chair is equipped with caster wheels to allow a healthcare professional or other caretaker to easily move furniture, but locked casters are desired when a person is getting in and out of the chair or when the chair and person are not attended by a healthcare professional or other caretaker. Accordingly, pieces of movable furniture with casters may also include a braking mechanism.

Further, the supporting caster wheel arrangements typically used to support the seating arrangement and provide the necessary mobility can operate in such a manner as to make the seating arrangement difficult to maneuver and unruly, required a significant amount of effort to maintain a desired path of travel. Various steering mechanisms have been developed to assist in the maneuvering of such seating arrangements.

Users of the movable chairs, beds and tables require a fast and simple way to activate and deactivate these caster brakes and steering mechanisms. For example in healthcare, caretakers have faced a number of challenges when dealing with movable furniture. One of those challenges has been the need to bend down to activate and deactivate the braking and steering mechanisms, and not have a stable hold on the chair, bed or table while doing so. This is inconvenient for both caretakers and patients alike.

Caretakers often are not able to activate and deactivate the braking and steering mechanisms on both sides of the piece of furniture. This is inconvenient for the caretakers, and can create difficulties when transferring patients in and out of a movable chair because the activation device may be between the chair and another piece of furniture or too close to a wall, and therefore not accessible. Furthermore, braking and steering mechanisms having one lever to activate the mechanisms and another lever to deactivate the mechanisms are cumbersome and confusing to users, especially in emergency situations.

Thus, an activation mechanism that allows a user to maintain a hold on a piece of movable furniture during activation and to easily activate/deactivate braking mechanisms and steering mechanisms is desired.

BRIEF SUMMARY

In one embodiment, a medical patient support arrangement includes a platform configured to support a patient, a chassis attached to the platform, and a pair of wheel assemblies laterally spaced from one another across a width of the chassis and movably coupled to the chassis, where the pair of wheel assemblies are operable between a first state and a second state different from the first state. The embodiment further includes an activation mechanism that controls the movement of each of the wheels of the pair of wheels with respect to the chassis, where the activation mechanism includes a track having a first stable position and a second stable position spaced along a length of the track, and where the activation mechanism further includes a pin configured to travel along the track, and wherein each of the wheels of the pair of wheels is in the first state when the pin is in the first stable position and each of the wheels of the pair of wheels is in the second state when the pin is in the second stable position.

In another embodiment, a medical patient support arrangement includes a platform configured to support a patient, a chassis attached to the platform, and a pair of wheel assemblies laterally spaced from one another across a width of the chassis and movably coupled to the chassis, where the pair of wheel assemblies are operable between a first state and a second state different from the first state. The embodiment further includes an activation mechanism that controls the movement of each of the wheels of the pair of wheels with respect to the chassis, where the activation mechanism includes a track having a first stable position and a second stable position spaced along a length of the track, and where the activation mechanism further includes a pin configured to travel along the track, and wherein each of the wheels of the pair of wheels is in the first state when the pin is in the first stable position and each of the wheels of the pair of wheels is in the second state when the pin is in the second stable position. The embodiment still further includes a movable foot pedal adapted to receive an input from an operator, the foot pedal operably coupled to the activation mechanism to move the pin between the first and second stable positions, wherein the foot pedal partially extends from beneath the chassis and is substantially parallel with a floor surface when the pin is in the first stable position.

In yet another embodiment, a medical patient support arrangement includes a platform configured to support a patient, a chassis attached to the platform, and one or more wheel assemblies coupled to the chassis and operable between a locked state where a wheel of the one or more wheel assemblies is locked from rotation, and an unlocked state where the wheel is free to rotate. The embodiment further includes an activation mechanism that controls the operation of the one or more wheel assemblies, where the activation mechanism includes a track having a first stable position and a second stable position spaced along a length of the track, and where the activation mechanism further includes a pin configured to travel along the track, and wherein each of the wheel is in the unlocked state when the pin is in the first stable position and the wheel is in the locked state when the pin is in the second stable position.

These and other features, advantages, and objects of the various embodiments will be further understood and appreciated by those skilled in the art by reference to the following specification, claims, and appended drawings.

BRIEF DESCRIPTION OF THE DRAWINGS

The foregoing and other items and advantages of the various embodiments will be appreciated more fully from the following figures, where like reference characters designate like features in which:

FIG. 21C is a cut-away side elevational view of the activation subassembly with the subassembly shown in a deployed position; and FIG. 21D is a cut-away side elevational view of the activation subassembly with the subassembly shown in a second temporary stop position.

DETAILED DESCRIPTION OF THE INVENTION

For purposes of description herein, it is to be understood that the specific devices illustrated in the attached drawings, and described below are simply exemplary embodiments. Hence, specific dimensions and other physical characteristics relating to the embodiments disclosed herein are not to be considered as limiting. Also, components described hereinafter as making up various elements of the invention are intended to be illustrative and not limiting. Many suitable components that would perform the same or similar functions as the components described herein are intended to be considered within the scope of the invention.

Figure 1:
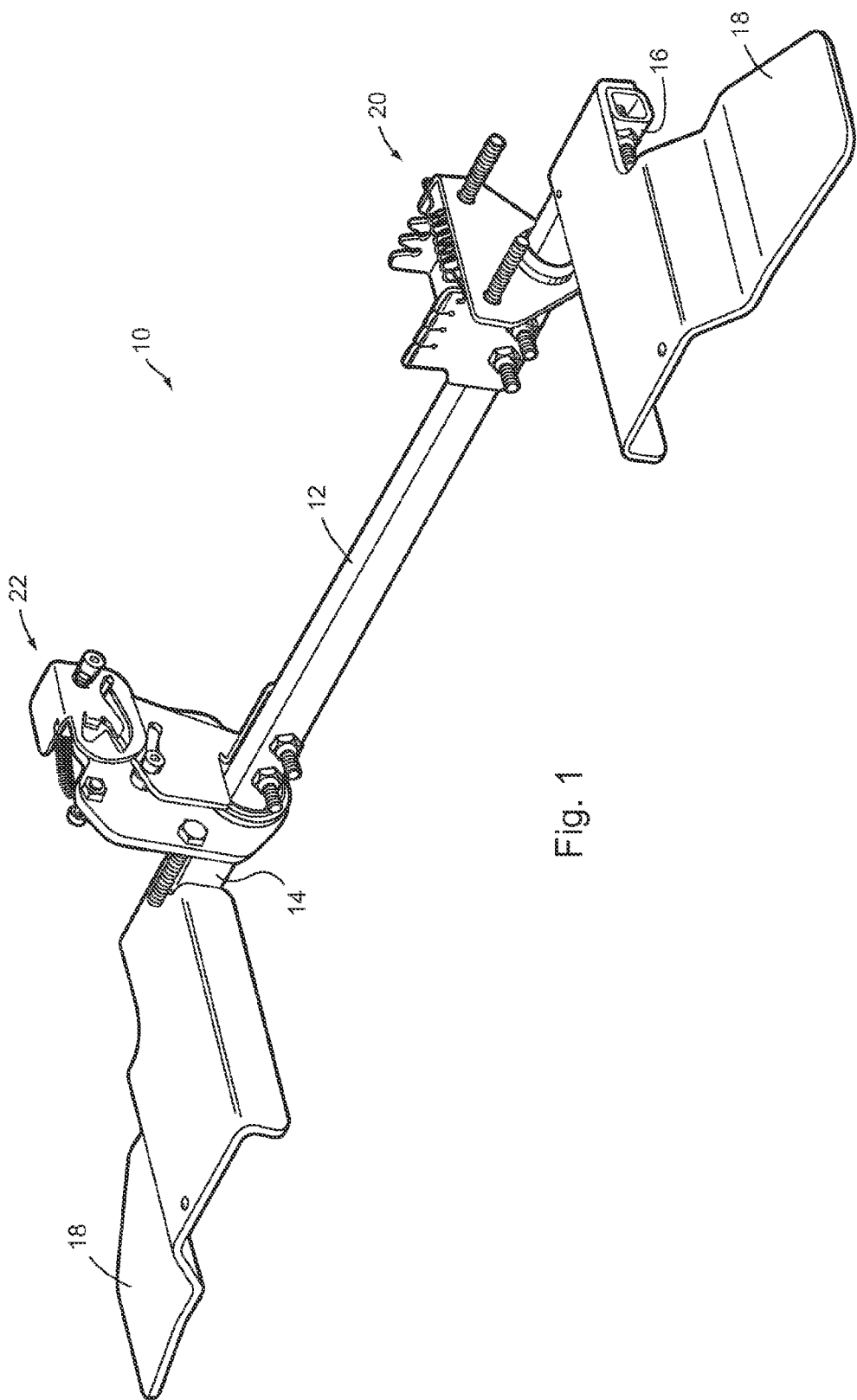
FIG. 1 is a perspective view of an embodiment of a braking activation mechanism, the brake activation mechanism including a cable junction and an activation subassembly.
Figure 2:
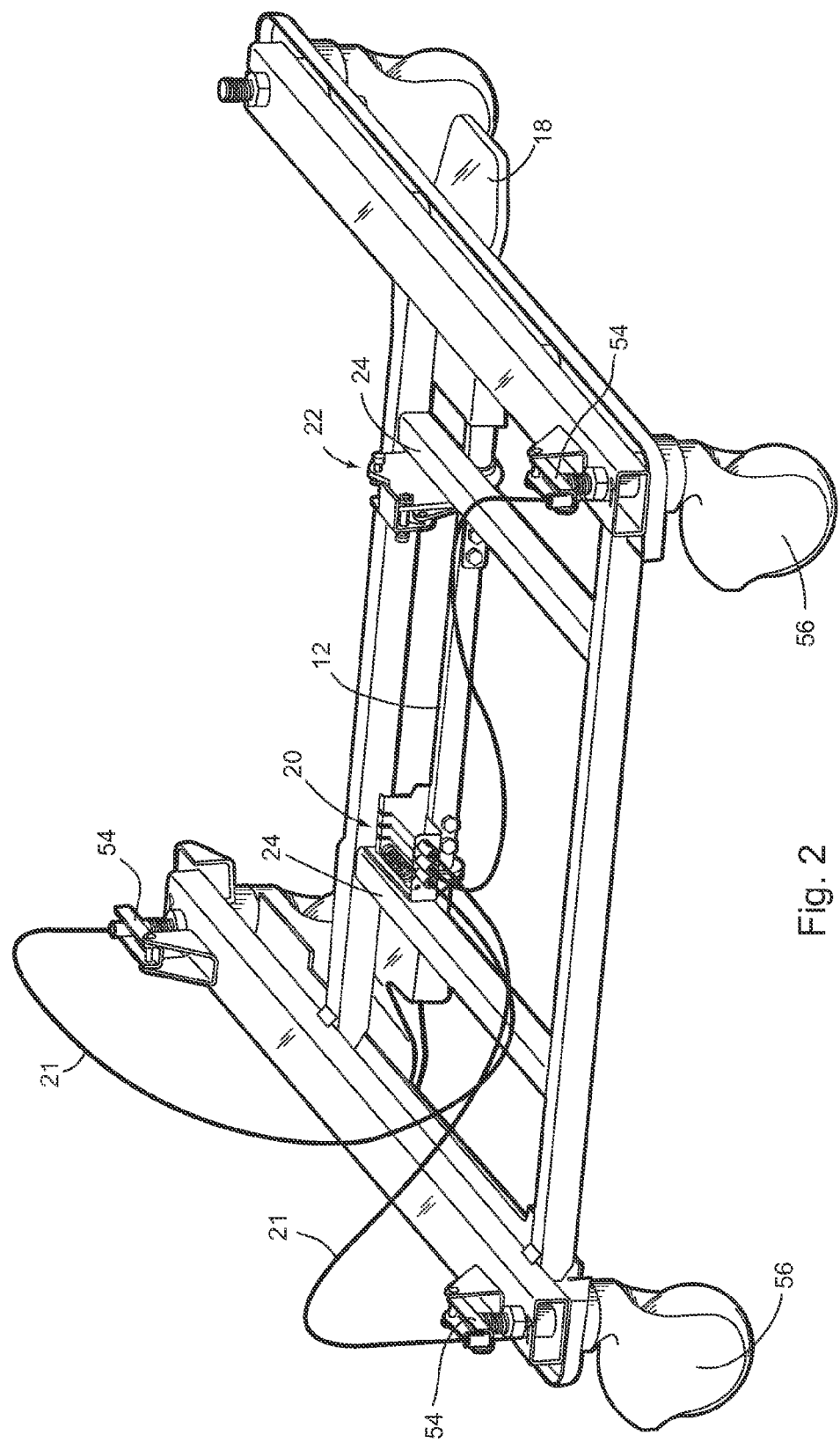
FIG. 2 is a perspective view of the braking activation mechanism of FIG. 1 attached to a movable chassis.
Figure 3:
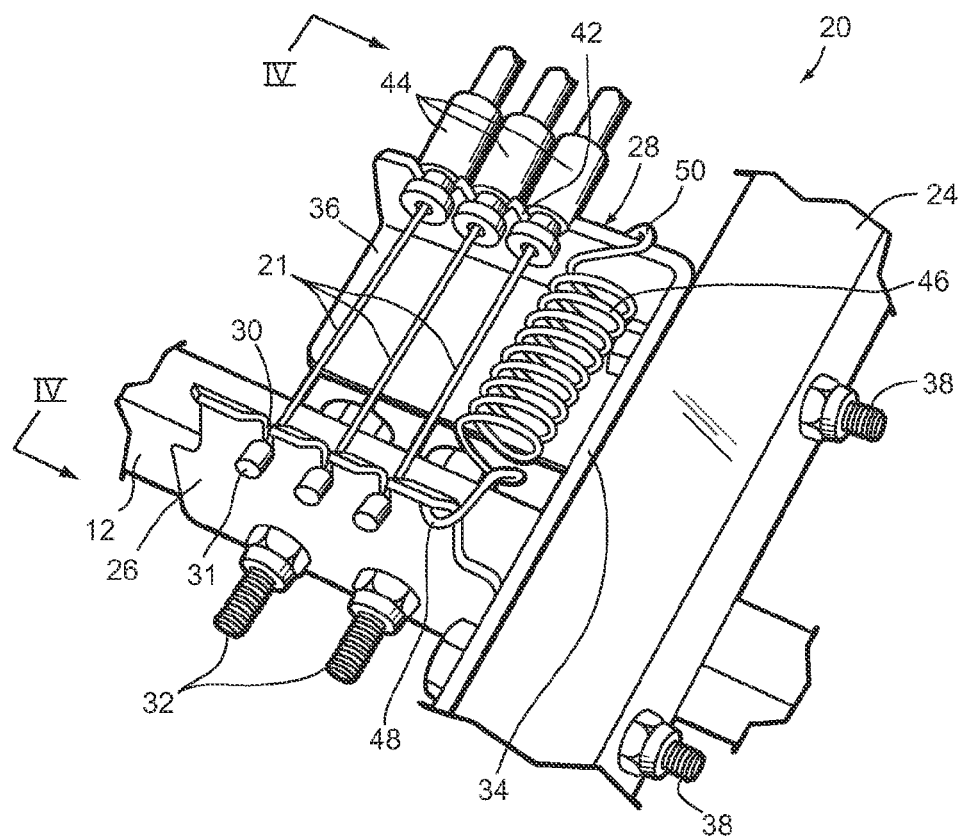
FIG. 3 is a top perspective view of the cable junction of the braking activation mechanism of FIG. 1.

Referring to FIG. 1, an embodiment of a brake activation mechanism 10 includes a connecting rod 12 having a first end 14 and a second end 16; at least one pedal 18 attached to the connecting rod 12; a cable junction 20 and an activation subassembly 22. As illustrated in FIG. 2, the brake activation mechanism 10 can be attached to a chassis 24. The chassis 24 can be attached to a supporting platform of a chair, a bed, a table, or any other movable product.

Referring to FIGS. 1 and 2, the connecting rod 12 may be any shape, but preferably includes at least one planar surface. In one embodiment, the connecting rod 12 is a tube having a square cross section. The connecting rod 12 is attached to a chassis 24 and spans a width of the chassis. In an exemplary embodiment, the connecting rod 12 is attached to an underside of the chassis 24. At least one pedal 18 is fixed to an end of the connecting rod 12 and preferably, a pedal 18 is fixed to the first end 14 of the connecting rod 12 and a pedal 18 is fixed to the second end 16 of the connecting rod. The pedal 18 extends slightly from underneath a side of the chassis 24. The pedal 18 may be any shape, but preferably has a flat paddle shape for easy foot access. In an exemplary embodiment, the cable junction 20 and actuation subassembly 22 are positioned toward opposite ends 14, 16 of the connecting rod 12. However, the cable junction 20 and activation subassembly 22 can be positioned anywhere on the connecting rod 12.

Figure 6:
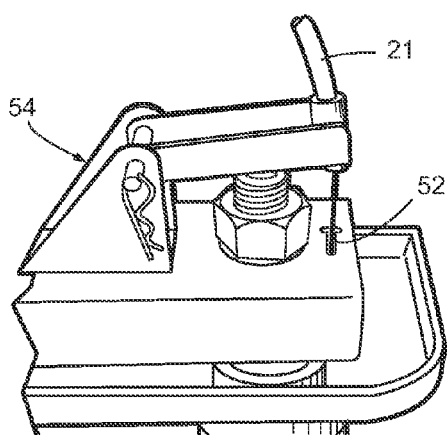
FIG. 6 is a side perspective view of a portion of FIG. 2, showing a braked caster.

Now referring to FIGS. 1 and 3-6, the cable junction 20 holds a plurality of brake cables 21 and includes a first cable holding portion 26 and a second cable holding portion 28. The first cable holding portion 26 of the cable junction 20 includes slits 30 at a top edge and fastening apertures at a bottom end. First ends 31 of the plurality of brake cables 21 fit in the slits 30 and are held there. Fasteners 32, such as bolts, pass through the fastening apertures at the bottom end of the first cable holding portion 26 to secure the first cable holding portion of the cable junction 20 to the connecting rod 12. The second cable holding portion 28 of the cable junction 20 includes a V-shaped plate 34 and an adjacent attached L-shaped bracket 36. The V-shaped plate 34 is attached to the chassis 24 by fasteners 38, such as bolts, and is apertured to contain a bearing 40 that surrounds the connecting rod 12 at a first bearing point. The L-shaped bracket 36 contains notches 42 for supporting brake cable end fittings 44 through which the plurality of brake cables 21 pass. A spring 46 having a first end 48 and a second end 50 is connected at its first end 48 to the first cable holding portion 26 and at its second end 50 to the second cable holding portion 28. As illustrated in FIG. 6, second ends 52 of the plurality of brake cables 21 are operatively attached to a plurality of brakes 54. In a preferred embodiment, the brakes 54 are attached to wheels such as casters 56.

Figure 7:
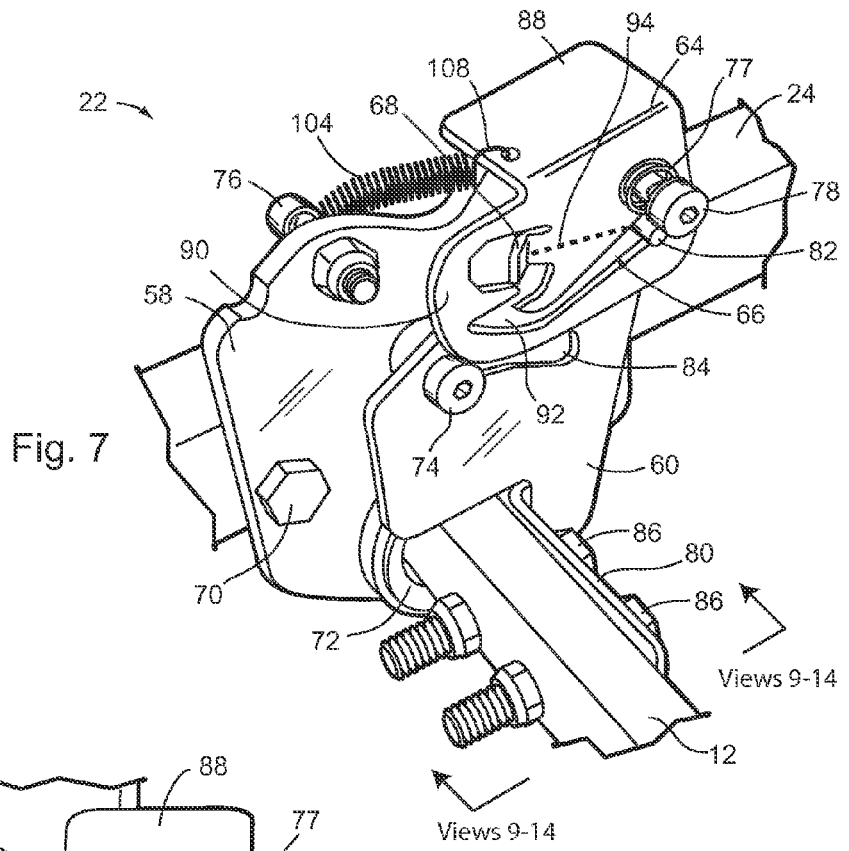
FIG. 7 is a side perspective view of the activation subassembly of the braking activation mechanism of FIG. 1, the activation subassembly including a pin and a discontinuous track.
Figure 8:
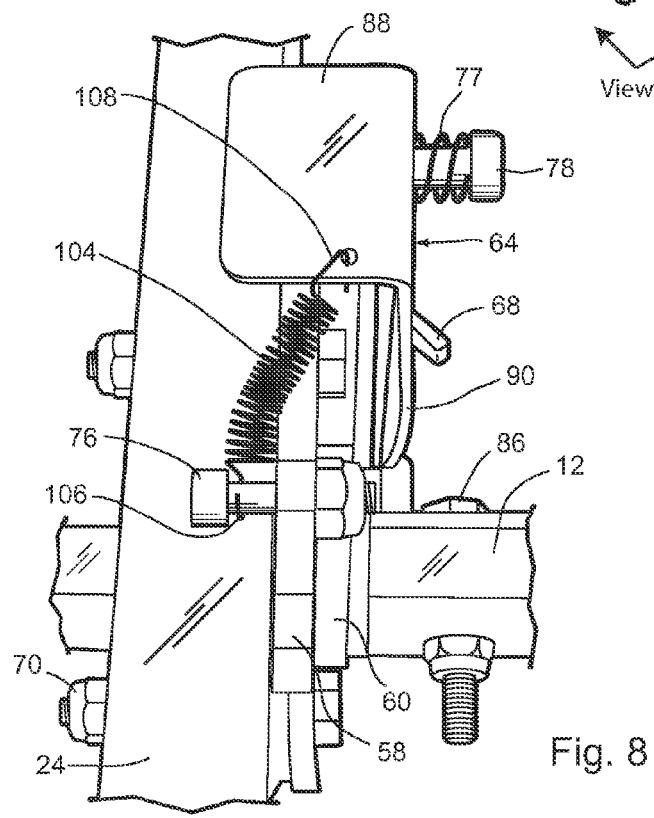
FIG. 8 is a top view of the activation subassembly of FIG. 7.

As illustrated in FIGS. 7 and 8, the activation subassembly 22 includes a plate 58, a cam 60, a flipper 64 having a discontinuous track 66 and ramp 68. The plate 58 is fixed to the chassis 24 by fasteners 70, such as bolts, and apertured to contain a bearing 72 that surrounds the connecting rod 12 at a second bearing point. The plate 58 further includes a guide rod 74, a spring connection rod 76, and a spring 77 biased rod 78. The guide rod 74 protrudes from a center of the plate 58 towards the center of the brake activation mechanism 10. The spring connection rod 76 protrudes from an upper portion of the plate 58 away from the center of the mechanism 10. The spring 77 biased rod 78 protrudes from the plate 58 toward the center of the mechanism 10.

Referring to FIG. 7, the cam 60 includes a tab 80 at its lower end, a pin 82 at its upper end, and a guide track 84 proximate its center. The tab 80 is apertured to allow fasteners 86, such as bolts, to pass there through and fix the cam 60 to the connecting rod 12. The pin 82 protrudes from the cam 60 towards the center of the mechanism 10. The pin 82 travels along a path defined by the discontinuous track 66 of the flipper 64. The guide track 84 houses the guide rod 74 that is fixed to the plate 58. The guide rod 74 moves in the guide track 84 to maintain the position of the cam 60 relative to the plate 58.

Still referring to FIG. 7, the flipper 64 includes an upper portion 88 and a lower portion 90. The lower portion 90 of the flipper 64 is positioned at the upper end of the cam 60 on the side of the cam 60 that is closest to the center of the mechanism 10. The lower portion 90 includes the discontinuous track 66, the ramp 68, and an aperture. The spring 77 biased rod 78 protruding from the plate 58 passes through the aperture to loosely and pivotably connect the flipper 64 to the plate. The discontinuous track 66 is a complete and closed loop including two types of track, namely an open slot portion 92 and a surface path portion 94. The open slot portion 92 of the discontinuous track 66 includes a home position 96 and bends which define a first temporary stop position 98, an engaged position 100 and a second temporary stop position 102. The home position 96, first temporary stop position 98, engaged position 100 and secondary temporary stop position 102 function as stop points for the pin 82. The home position 96 is located at one end of the open slot portion 92 of the discontinuous track 66 and the ramp 68 is located at an opposite end of the open slot portion 92. The ramp 68 operates to transition the pin 82 from the open slot portion 92 to the surface path portion 94 of the discontinuous track 66. The surface path portion 94 is defined by a route connecting the ramp 68 and home position 96 in the open slot portion 92. The surface path portion 94 is located on a planar surface of the lower portion 90 of the flipper 64 which faces the plate 58. The upper portion 88 of the flipper 64 is positioned over the cam 60 and the plate 58, away from the center of the mechanism 10. As best illustrated in FIG. 8, a spring 104 connects the plate 58 spring connection rod 76 to the flipper 64 upper portion 88. In particular, a first end 106 of spring 104 engages the spring connection rod 76 and a second end 108 engages the upper portion 88.

Figure 4:
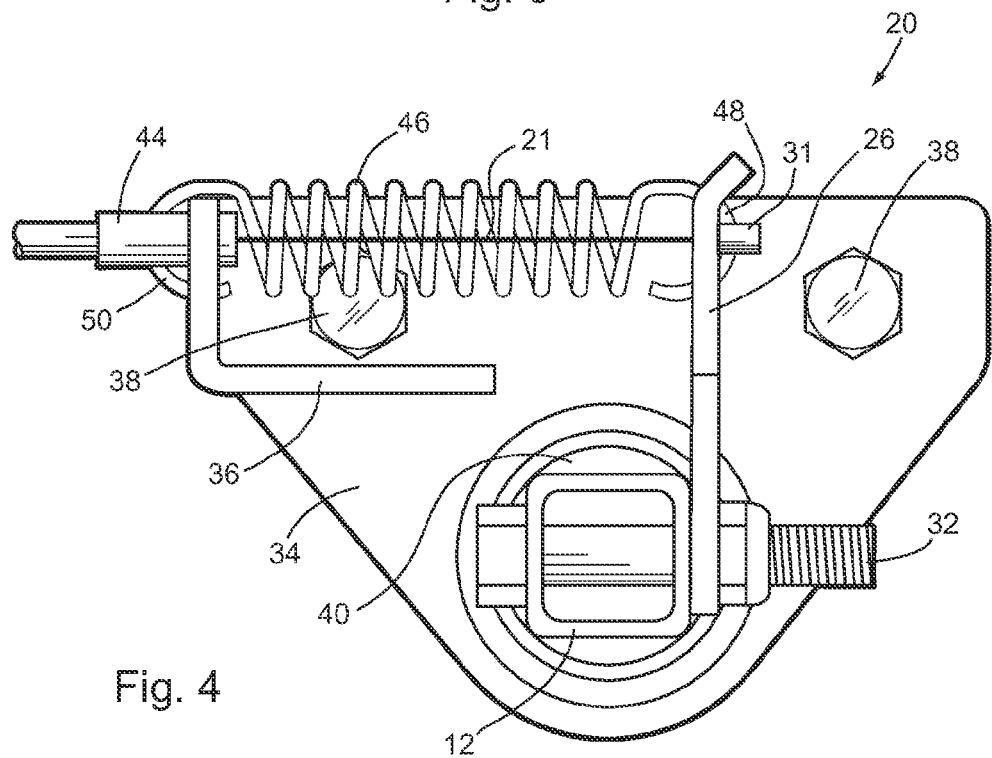
FIG. 4 is a side view of the cable junction of FIG. 3 when the braking activation mechanism is in an unlocked state.
Figure 5:
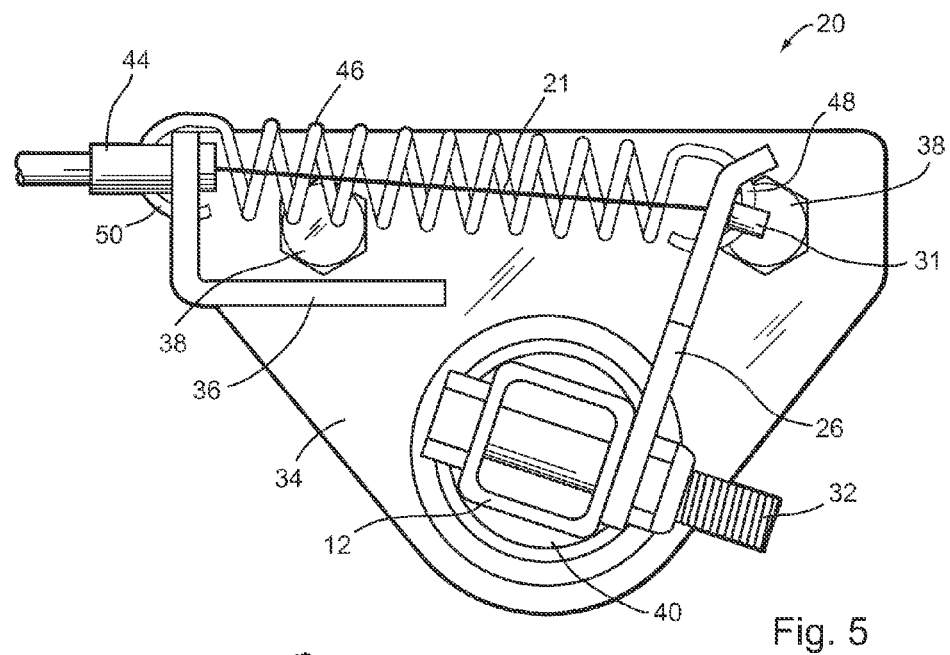
FIG. 5 is a side view of the cable junction of FIG. 3 when the braking activation mechanism is in a locked state.
Figure 9:
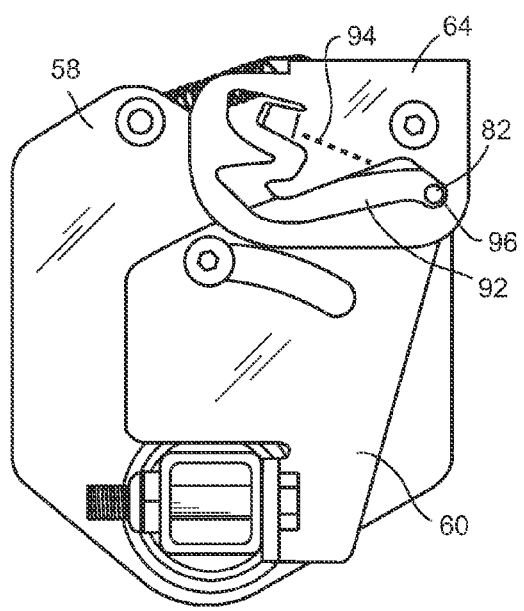
FIG. 9 is schematic side view of the activation subassembly of FIG. 7, where the braking activation mechanism is in the unlocked state and the pin is in a home position of the discontinuous track.
Figure 10:
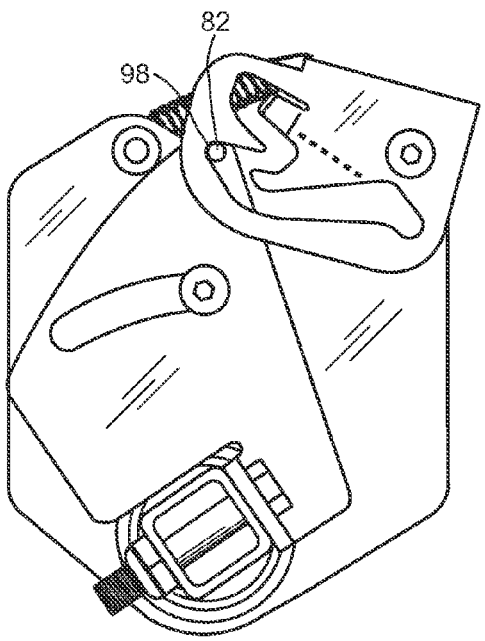
FIG. 10 is a schematic side view of the activation subassembly of FIG. 7, where the braking activation mechanism is being activated and the pin is in a first temporary stop position of the discontinuous track.

When the brake activation mechanism 10 is deactivated, the chassis 24 is movable and the at least one pedal 18 is parallel with the floor. The first and second cable holding parts 26, 28 of the cable junction 20 are perpendicular to the floor and parallel to each other as illustrated in FIG. 4. Referring to FIG. 9, the pin 82 is in the home position 92 in the discontinuous track 66 of the flipper 64.

Figure 11:
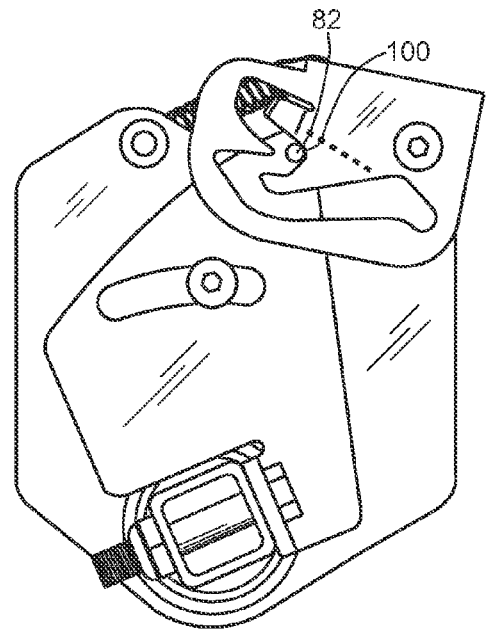
FIG. 11 is a schematic side view of the activation subassembly of FIG. 7, where the braking activation mechanism is in the locked state and the pin is in an engaged position of the discontinuous track.

To activate the brake activation mechanism 10, a user depresses a pedal 18. The pedal 18 rotates downward relative to the connecting rod 12 forming an acute angle with the floor. Where there is a pedal 18 located on opposite sides of the chassis, the user only needs to push one of the pedals which causes both pedals to rotate downward. For clarity, activation and deactivation of the brake activation mechanism are described in terms of one pedal, but it is to be understood that the mechanism may include two pedals. Because the pedal 18 is fixed to the connecting rod 12, the connecting rod also rotates. As the connecting rod 12 rotates, the cam 60 which is fixed to the connecting rod, also rotates. As illustrated in FIGS. 9-14, rotation of the cam 60 causes the pin 82 to move along the discontinuous track 66 of the flipper 64. First, the user steps on the pedal 18, which moves the pin 82 from the home position 96 (FIG. 9) to a first temporary stop position 98 (FIG. 10) in the open slot portion 92 of the discontinuous track 66, thereby stretching the spring 104 between the flipper 64 and the plate 58. The stretch of the spring 104 and movement of the spring over the plate 58 provides audible feedback to the user to signal that the brake activation mechanism 10 will engage. Concomitantly, the first cable holding portion 26 of the cable junction 20, which is fixed to the connecting rod 12, also rotates with the pedal 18 and connecting rod. The first cable holding portion 26 rotates away from the second cable holding portion 28 of the cable junction 20, thereby creating an obtuse angle between the lower ends of the first and second cable holding portions. When the user then removes his or her foot from the pedal 18, the pedal slightly rotates back up away from the floor, but still maintains a rotated position relative to the floor. As the pedal 18 rotates slightly back, the connecting rod 12 also rotates slightly, which causes the pin 82 on the cam 60 to snap up from the first temporary stop position 98 (FIG. 10) to the engaged position 100 (FIG. 11). The first cable holding portion 26 of the cable junction 20 remains angled away from the second cable holding portion 28, thereby forming an obtuse angle between the lower ends of the first and second cable holding portions and holding tension in the plurality of braking cables 21. Tension in the plurality of braking cables 21 causes the brakes 54 to be activated and lock the caster wheels 56. The rotated position of the at least one pedal 18 is a visible indication to the user that the brakes 54 are engaged and the caster wheels 56 are locked. In one embodiment, three caster wheels 56 are equipped with brakes 54 to prevent any movement of the chassis 24 when the brakes are engaged.

Figure 12:
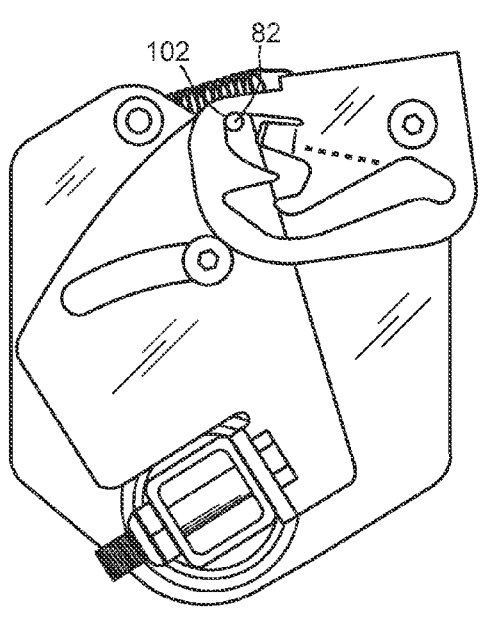
FIG. 12 is a schematic side view of the activation subassembly of FIG. 7, where the braking activation mechanism is being activated and the pin is in a second temporary stop position of the discontinuous track.
Figure 13:
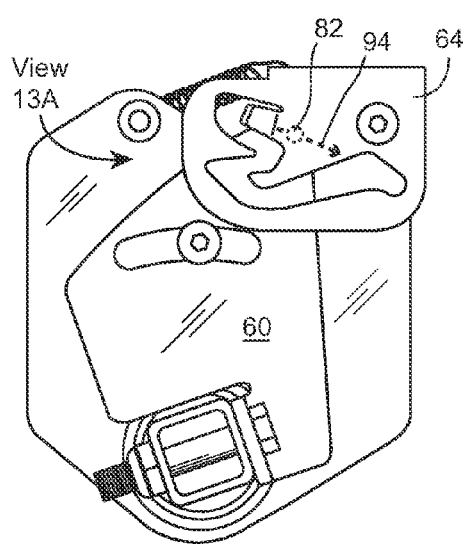
FIG. 13 is a schematic side view of the activation subassembly of FIG. 7, where the braking activation mechanism is being activated and the pin is traveling along a surface path portion of the discontinuous track.
Figure 14:
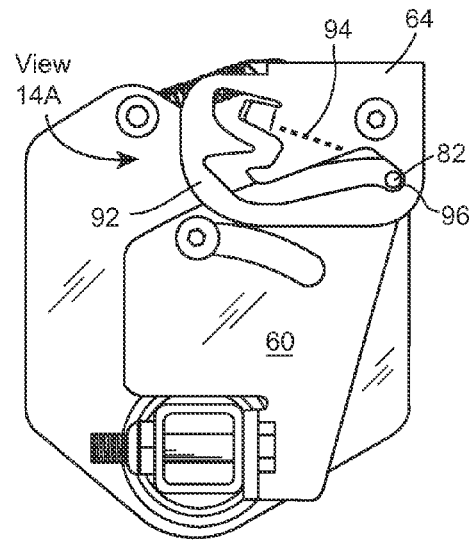
FIG. 14 is a schematic side view of the activation subassembly of FIG. 7, where the braking activation mechanism is in the unlocked state and the pin is in the home position of the discontinuous track.
Figure 13A:
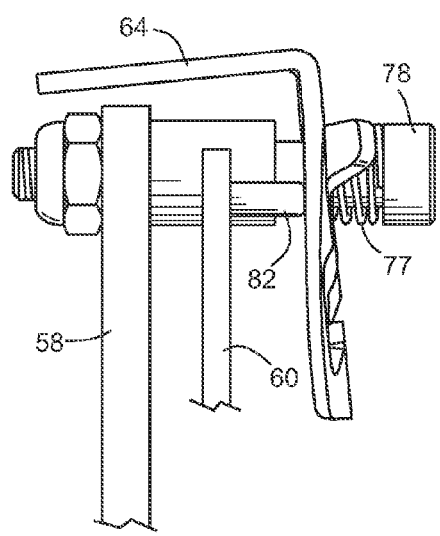
FIG. 13A is a cutaway end view of the activation subassembly of FIG. 13.
Figure 14A:
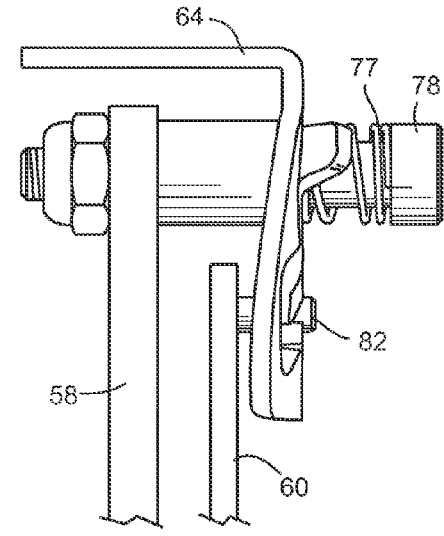
FIG. 14A is a cutaway end view of the activation subassembly of FIG. 14.

To deactivate the brake activation mechanism 10, the user again steps downward on pedal 18. This downward motion rotates the cam 60 with the connecting rod 12 causing the pin 82 to move out of the engaged position 100 (FIG. 11) in the open slot portion 92 of the discontinuous track 66 and to a second temporary stop position 102 (FIG. 12). Movement of the pin 82 on the cam 60 to the second temporary stop position 102 stretches the spring 104 between the flipper 64 and the plate 58, which again provides audible feedback to the user to signal the deactivation of the brake activation mechanism 10. When the user removes their foot from the pedal 18, the pedal 18 rotates up away from the floor which causes the connecting rod 12 to rotate, thereby rotating the cam 60. The rotating cam 60 moves the pin 82 through the open slot portion 92 of the discontinuous track 66 toward the ramp 68. Referring to FIG. 13A, when the pin 82 contacts the ramp 68, the ramp forces the flipper 64 to translate on the spring 77 biased rod 78 away from the pin 82, cam 60, and plate 58. The pin 82 travels up the ramp 68, behind the flipper and onto the surface path portion 94 of the discontinuous track 66 (FIG. 13), and returns to the home position 96 (FIG. 14). As soon as the pin 82 reaches the home position 96, the spring 77 between the flipper 64 and the plate 58 forces the flipper back into alignment with the pin in its home position (FIGS. 14 and 14A). The first cable holding portion 26 of the cable junction 20 also returns to its deactivated position of being perpendicular to the floor releasing tension in the plurality of braking cables 21. Release of the tension in the plurality of braking cables 21 causes the brakes 54 to be deactivated and unlock the caster wheels 56. The unrotated position of the at least one pedal 18 is a visible indication to the user that the brakes 54 are disengaged and the caster wheels 56 are unlocked.

As described in detail above, the flipper 64 is adapted to include three degrees of motion which facilitates movement of the pin 82 along the discontinuous track 66. As illustrated in FIGS. 9-12, the flipper 64 moves in an X-Y direction parallel to plate 58 as the pin 82 travels along the open slot portion 92 of the discontinuous track 66. As illustrated in FIGS. 13 and 13A, when the pin 82 contacts the ramp 68 and travels along the surface path portion 94 of the discontinuous track 66, the flipper 64 additionally translates in a Z-direction away from plate 58. Movement in the Z-direction is limited by upper portion 88 of the flipper 64 coming into contact with plate 58. Referring to FIGS. 14 and 14A, when the pin 82 reaches home position 96, the flipper 64 again translates in a Z-direction toward the plate 58.

Figure 15:
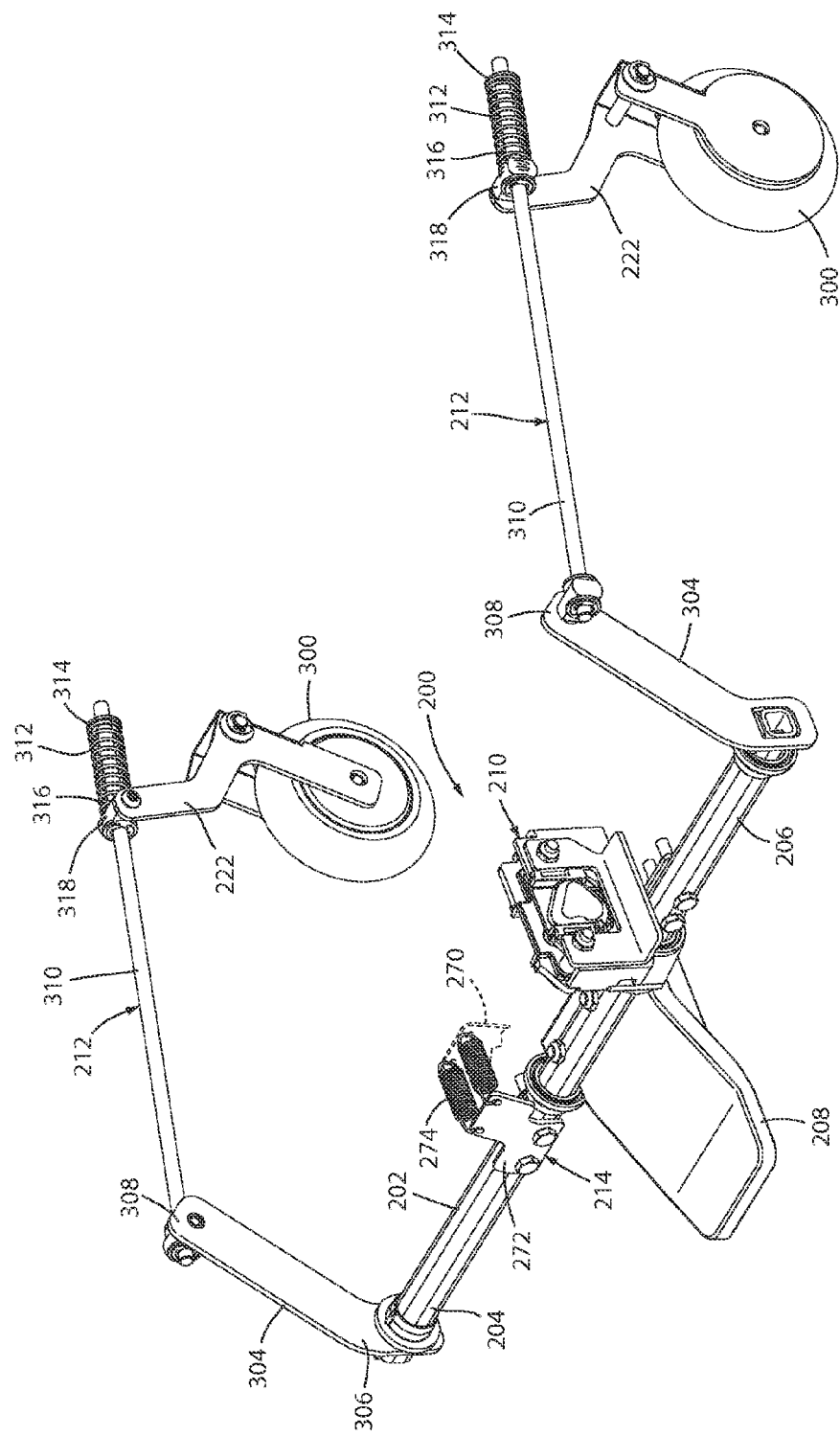
FIG. 15 is a perspective view of an embodiment of a steering activation mechanism, the steering activation mechanism including an activation subassembly.
Figure 16:
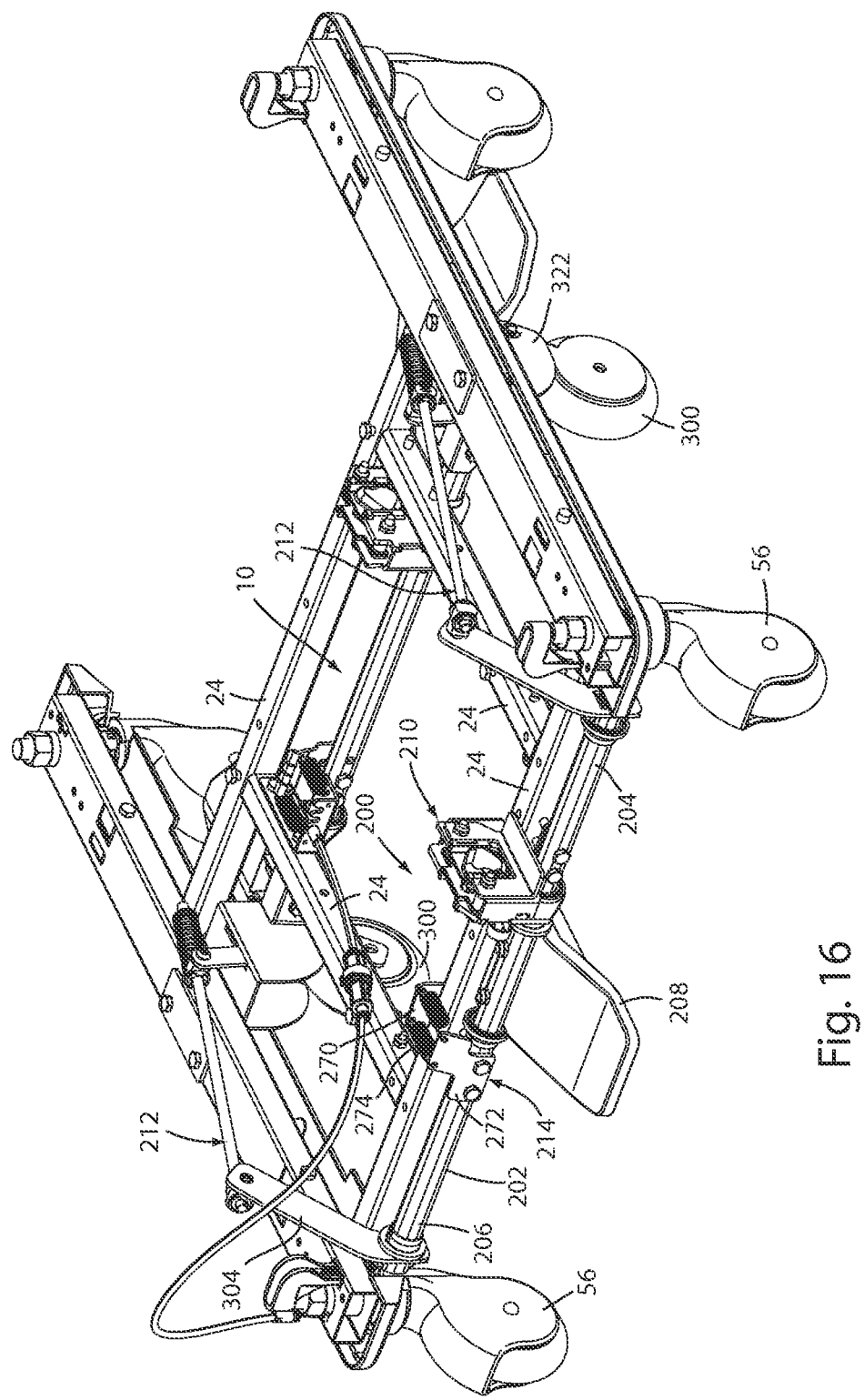
FIG. 16 is a perspective view of a braking activating mechanism and the steering activation mechanism attached to a movable chassis.
Figure 17:
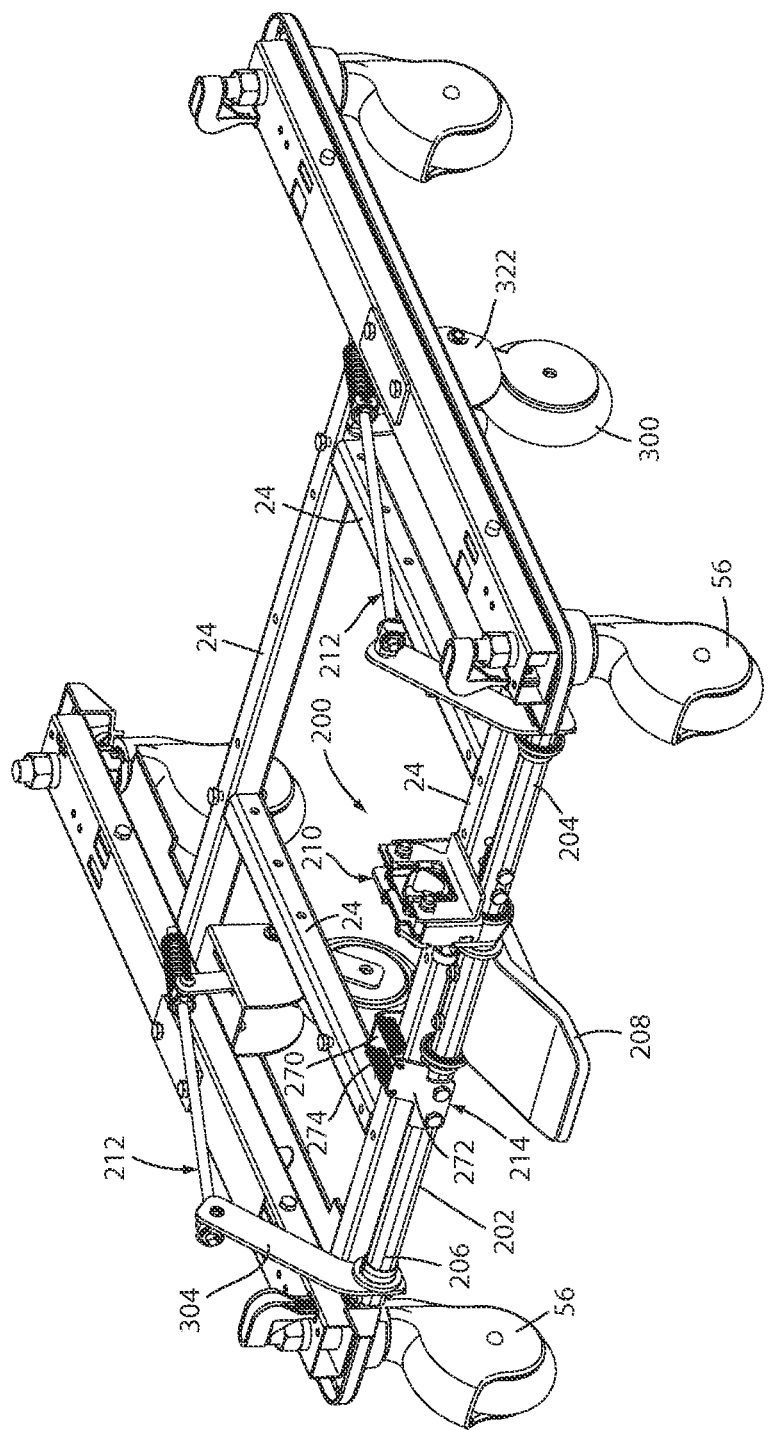
FIG. 17 is a perspective view of the steering activation mechanism attached to a movable chassis.

Referring to FIG. 15, an embodiment of a steering activation mechanism 200 includes a connecting rod 202 having a first end 204 and a second end 206, a pedal 208 attached to the connecting rod 202, an activation subassembly 210, a pair of wheel linkage assemblies 212, and a biasing assembly 214. As illustrated in FIGS. 16 and 17, the steering activation mechanism 200 can be attached to the chassis 24. The chassis 24 can be attached to a supporting platform of a chair, a bed, a table, or any other movable product.

Referring to FIGS. 15-17, the connecting rod 202 may be any shape, but preferably includes at least one planar surface. In one embodiment, the connecting rod 202 is a tube having a square cross section. The connecting rod 202 is attached to a chassis 24 and spans a width of the chassis 24. In an exemplary embodiment, the connecting rod 202 is attached to an end of the chassis 24. The pedal 208 is fixed along the length of the connecting rod 202 and preferably, the pedal 208 is fixed at a midpoint of the connecting rod 202 and extends rearwardly from the chassis 24. The pedal 208 may be any shape, but preferably has a flat paddle shape for easy foot access. In an exemplary embodiment, the actuation subassembly 210 and the biasing assembly 214 are positioned along the length of the connecting rod 202 laterally outboard of the pedal 208. However, the activation subassembly 210 and the biasing assembly 214 can be positioned anywhere on the connecting rod 202.

Figure 18:
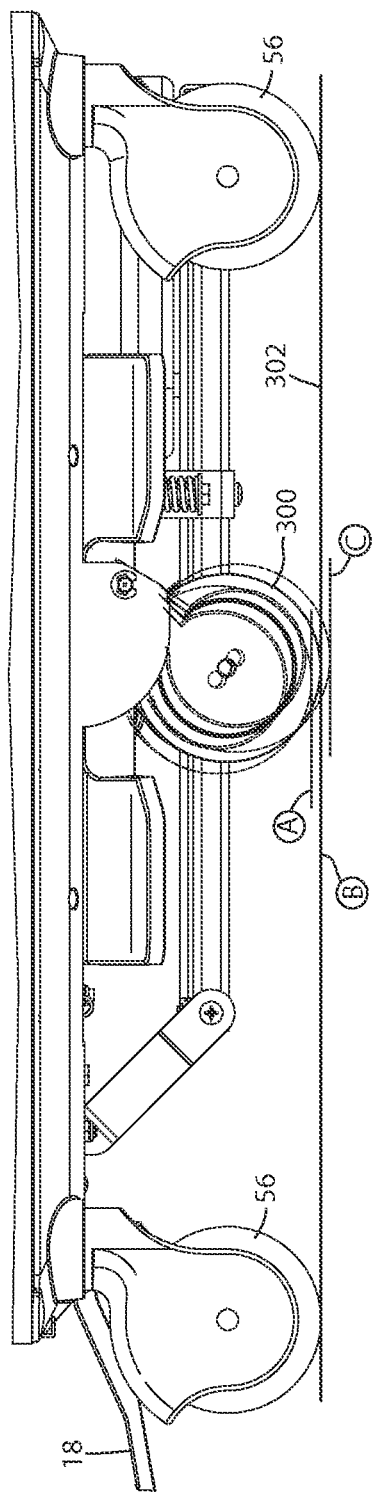
FIG. 18 is a side elevational view of the movable chassis and a steering wheel arrangement shown in multiple positions.

Now referring to FIGS. 15-17, the wheel linkage assemblies 212 operably couple the connecting rod 202 to a pair of steering wheels 300 and may be configured to move the wheels 300 (FIG. 18) between a first or storage position A where the wheels 300 are spaced from a floor supporting surface 302, and a second or deployed position B where the wheels 300 contact the floor surface 302. In the illustrated example, the linkage assembly 212 includes a pair of forwardly-angled arms 304 each having a first end 306 fixed for rotation with the connecting rod 202, and a second end 308 pivotably coupled to an actuator rod 310. A spring member 312 extends along a length of the associated actuator rod 310 and includes a first end 314 fixed to the actuator rod 310 and a second end 316 fixed to a slide bearing 318 slidable along the actuator rod 310. A wheel support arm 320 is pivotably coupled to the slide bearing 318 and to a wheel bracket 322 that is fixed with respect to the chassis 24 such that the wheel bracket 322 is pivotable between the first and second positions A, B. The wheels 300 are pivotably coupled to the associated wheel bracket 222. The spring 312 is configured such that the wheel 300 maintains contact with an uneven floor surface as represented by position C. It is noted that while the wheels 56 may comprise caster-type wheels that allow for swiveling of the wheels 56 with respect to the chassis 24, the wheels 300 cannot swivel with respect to the chassis 24, thereby requiring the wheels 300 to follow a relatively straight path while the associated supporting platform is maneuvered when the wheels 300 are in the deployed position B.

Figure 19:
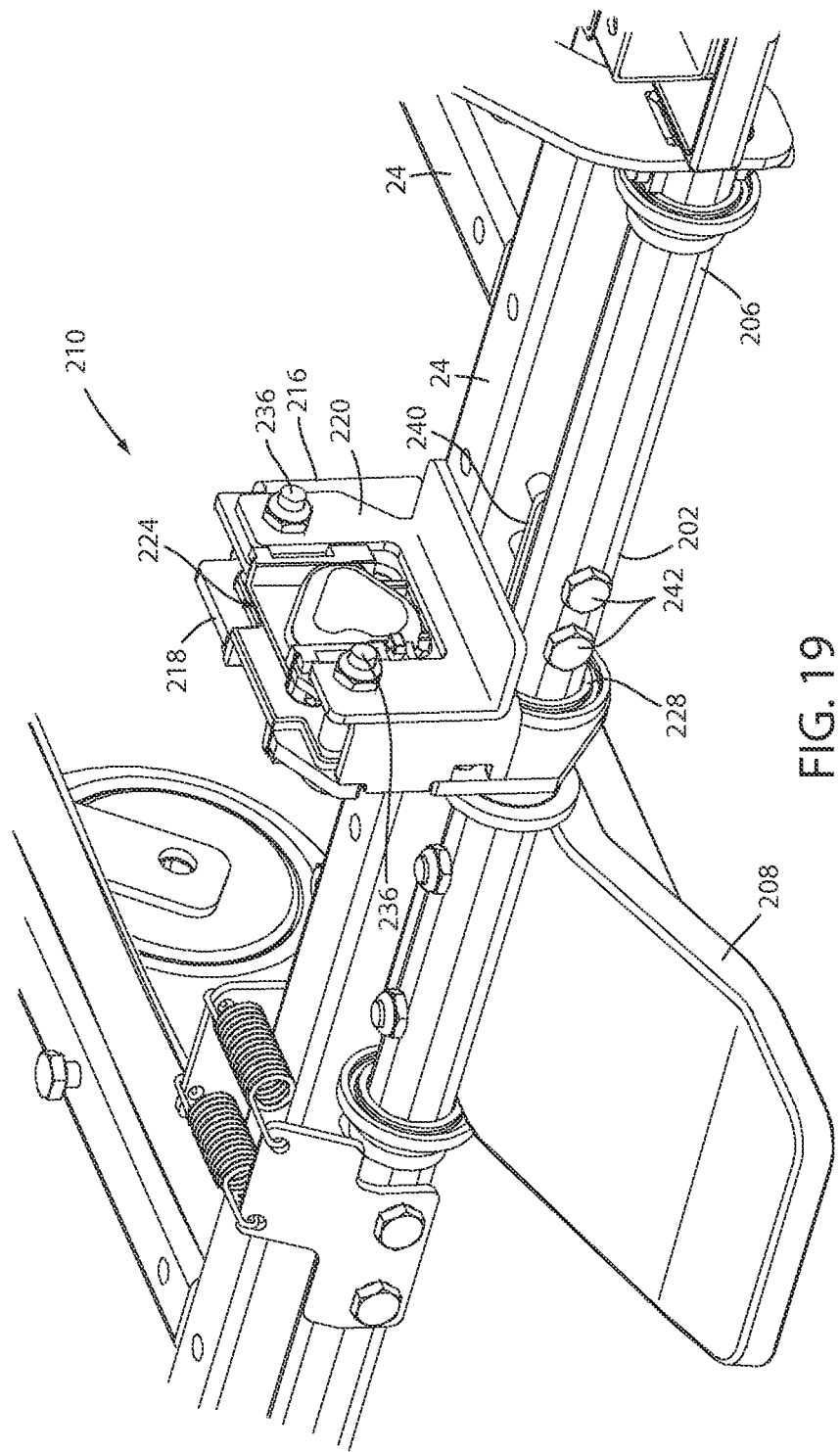
FIG. 19 is an enlarged perspective view of the activation subassembly.
Figure 20:
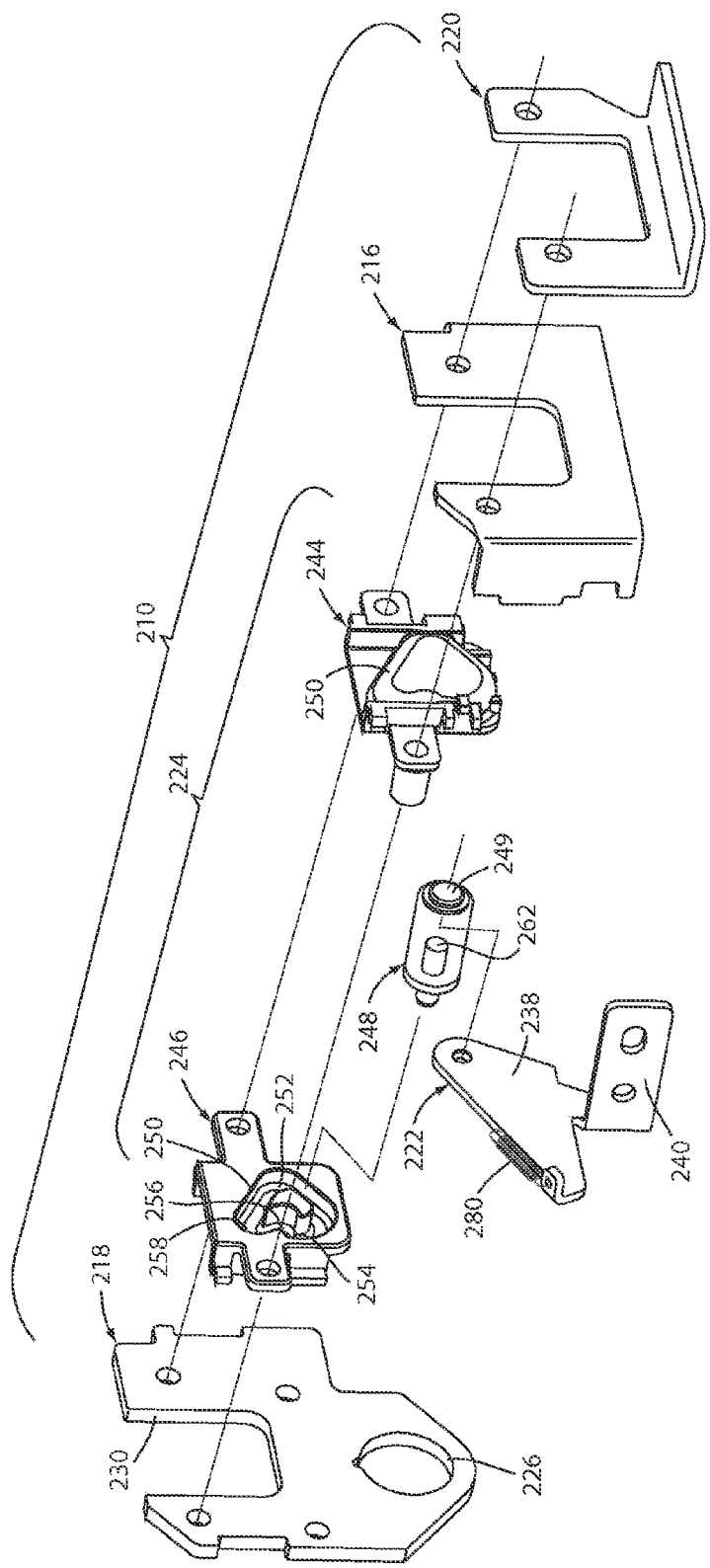
FIG. 20 is an exploded perspective view of the activation subassembly.
Figure 21B:
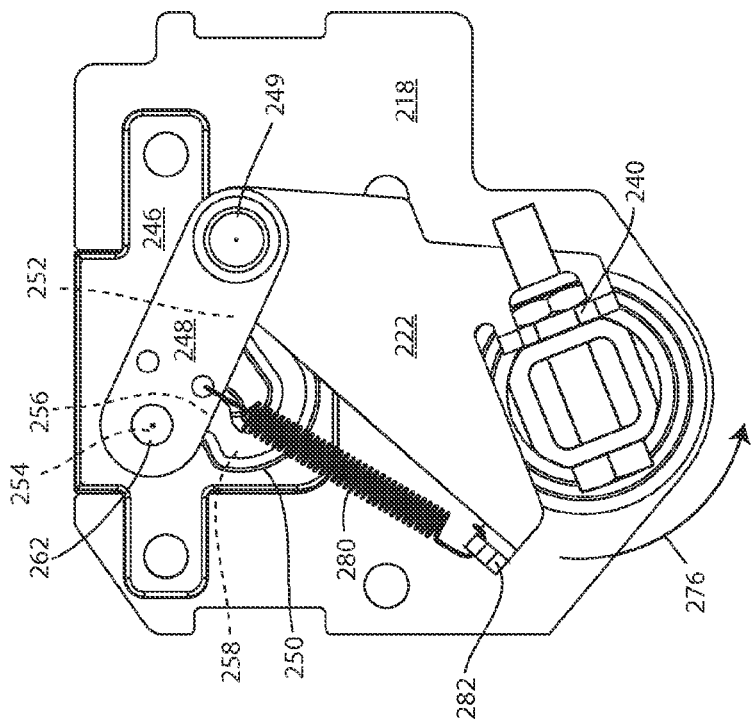
FIG. 21B is a cut-away side elevational view of the activation subassembly with the subassembly shown in a first temporary stop position.
Figure 21A:
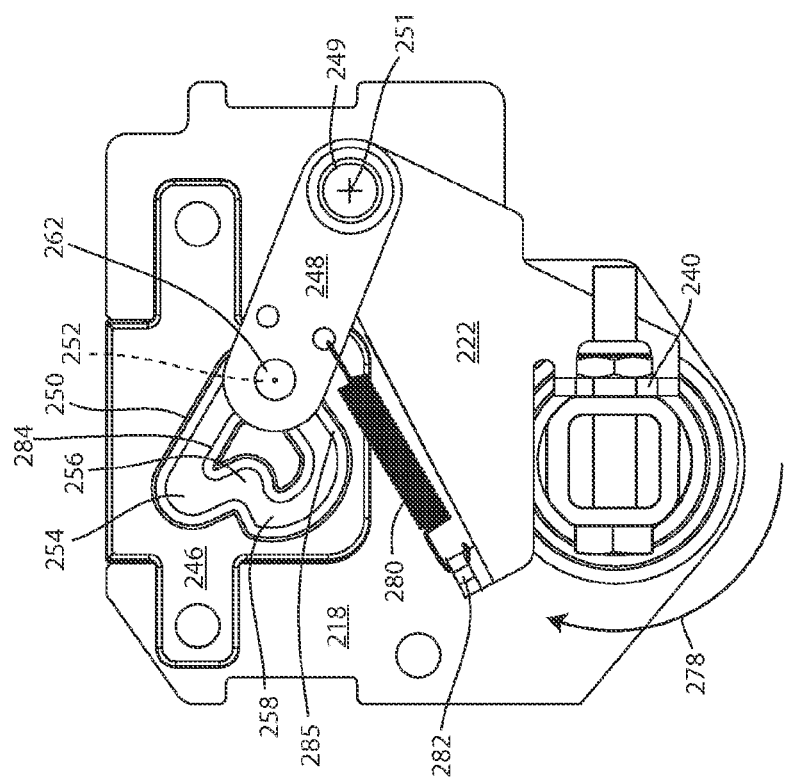
FIG. 21A is a cut-away side elevational view of the activation subassembly with the subassembly shown in a home position.

As illustrated in FIGS. 19 and 20, the activation subassembly 210 includes a pair of housing plates 216, 218 that cooperate to house other components of the activation subassembly 210, an alignment plate 220, a biasing plate 222, and a heart-and-pawl assembly 224. In the illustrated example, one or both of the housing plates 216, 218 may be U-shaped such that it cooperates with the other housing plate 218 to create the internal space to receive the heart-and-pawl assembly 224, and includes a rectangularly-shaped relief 225 that receives the heart-and-pawl assembly 224. The housing plate 218 includes an aperture 226 that receives a bearing arrangement 228 for pivotably guiding the connecting rod 202, and a rectangularly-shaped cut-out 230 that receives the heart-and-pawl assembly 224. The alignment plate 222 is L-shaped having a first portion 232 that abuts the chassis 24 and a second portion 234 that is secured to the housing plates 216, 218 via a pair of bolts 236. The biasing plate 222 includes a triangularly-shaped body portion 238 and an attachment portion 240 extending orthogonally from the body portion 238 and fixed for rotation with the connecting rod 202 via a pair of bolts 242.

The heart-and-pawl assembly 224 includes a first guide member 244, a second guide member 246, and a pawl member 248 that is pivotably coupled to the alignment plate 222 by a pivot pin 249 for pivoting about a pivot axis 251. The guide members 244, 246 are substantially mirror images of one another, and as such a description of the second guide member 246 is provided as an example. The guide member 246 includes a heart-shaped recess or track 250 that includes a home position 252, a first temporary stop position 254, a deployed position 256 and a second temporary stop position 258. While the recess or track 250 is illustrated as being heart-shaped, other suitable configurations may also be utilized. Referring to FIGS. 21a-21d, a pawl 262 of the pawl member 248 is shown in the home position 252 which corresponds to the wheels 300 being located in the second or storage position A. The biasing assembly 214 (FIGS. 15-17) includes a ground plate 270 fixed to the chassis 24 and a spring plate 272 fixed for rotation with the connecting rod 202. A pair of coil springs 274 bias the spring plate 272 toward the ground plate 270, and the connecting rod 202 in a clockwise direction 278, thereby biasing the pawl 262 into the home position 252 and the wheels 300 toward the storage position A. To deploy the wheels 300 from the storage position A to the deployed position B, an operator exerts a downward force on the pedal 208, thereby overcoming the biasing force exerted by the springs 274 and rotating the connecting rod 202 in a counter-clockwise direction 276, until the pawl 262 travels along the track 250 from the home position 252 to the first temporary stop position 254. It is noted that a spring member 280 is fixed to a flange 282 of the biasing plate 222 and the pawl member 248, and biases the pawl member 248 toward the biasing plate 222 such that the pawl 262 tracks along an inclined wall 284 of the track 250. The operator then releases the force being exerted on the pedal 208, thereby allowing the springs 274 to bias the pawl 262 into the deployed position 256 and securing the wheels 300 in the second or deployed position B. The operator may retract the wheels 300 from the deployed position B to the retracted position A by again exerting a downward force on the pedal 208 causing the connecting rod 202 to rotate in the counter-clockwise direction 276 until the pawl 262 travels along the track 250 from the deployed position 256 to the second temporary position 258. The operator then releases the force being exerted on the pedal 208 allowing the springs 274 to bias the connecting rod 202 in the clockwise direction 278 until the pawl 262 is biased into the home position 252 and the wheels 300 are biased in the storage position A. It is noted that the spring 280 biases the pawl member 248 toward the biasing plate 222 thereby forcing the pawl 262 to track along an inclined wall 285 of the track 250 as the pawl 262 moves from the second temporary position 258 to the home position 252.

In the foregoing description, it will be readily appreciated by those skilled in the art that modifications may be made to the various disclosed embodiments without departing from the concepts disclosed herein. Such modifications are to be considered as included in the following claims, unless these claims by their language expressly state otherwise.

The embodiments claimed are:

1. A medical patient support arrangement, comprising:
    a platform configured to support a patient;
    a chassis attached to the platform;
    at least one wheel assembly movably coupled to the chassis, the at least one wheel assembly operable between a first state and a second state different from the first state; and
    an activation mechanism that controls the movement of the at least one wheel assembly with respect to the chassis, the activation mechanism including a track having a first stable position and a second stable position spaced along a length of the track, the activation mechanism further including a pin configured to travel along the track, wherein the at least one wheel assembly is in the first state when the pin is in the first stable position and the at least one wheel assembly is in the second state when the pin is in the second stable position, wherein the first state of the at least one wheel assembly is a raised state and the second state of the at least one wheel assembly is a lowered state, and wherein the movement of the at least one wheel assembly is a vertical movement between the raised and lowered states; and
    a movable input member adapted to receive an input from an operator, the input member operably coupled to the activation mechanism to move the pin between the first and second stable positions;
    wherein a first input to the input member from the operator moves the pin along the track from the first stable position toward the second stable position;
    wherein a second input to the input member from the operator moves the pin along the track from the second stable position toward the first stable position; and
    wherein the activation mechanism is configured such that the input member is moved in the same direction for the first input and the second input.

2. The medical patient support arrangement of claim 1, wherein the pin is spring biased into the first stable position.

3. The medical patient support arrangement of claim 2, wherein the pin is spring biased into the second stable position.

4. The medical patient support arrangement of claim 1, wherein the pin travels through a continuous loop.

5. The medical patient support arrangement of claim 4, wherein the track is discontinuous.

6. The medical patient support arrangement of claim 1, further comprising:
    a movable input member adapted to receive an input from an operator, the input member operably coupled to the activation mechanism to move the pin between the first and second stable positions.

7. The medical patient support arrangement of claim 6, wherein a first input to the input member from the operator moves the pin along the track from the first stable position toward the second stable position.

8. The medical patient support arrangement of claim 7, wherein a second input to the input member from the operator moves the pin along the track from the second stable position toward the first stable position.

9. The medical patient support arrangement of claim 1, wherein the track is continuous.

10. The medical patient support arrangement of claim 1, further comprising:
    a pair of forward support wheels; and
    a pair of rearward support wheels; and
    wherein the at least one wheel assembly is located between the forward support wheels and the rearward support wheels.

11. The medical patient support arrangement of claim 1, wherein the at least one wheel assembly is coupled to the chassis to prevent swiveling of the wheel assembly with respect to the chassis.

12. The medical patient support arrangement of claim 1, wherein the medical support arrangement comprises a chair.

13. A medical patient support arrangement, comprising:
    a platform configured to support a patient;
    a chassis attached to the platform;
    at least one wheel assembly movably coupled to the chassis, the at least one wheel assembly operable between a first state and a second state different from the first state; and
    an activation mechanism that controls the movement of the at least one wheel assembly with respect to the chassis, the activation mechanism including a track having a first stable position and a second stable position spaced along a length of the track, the activation mechanism further including a pin configured to travel along the track, wherein the at least one wheel assembly is in the first state when the pin is in the first stable position and the at least one wheel assembly is in the second state when the pin is in the second stable position; and a movable input member adapted to receive an input from an operator, the input member operably coupled to the activation mechanism to move the pin between the first and second stable positions;

wherein a first input to the input member from the operator moves the pin along the track from the first stable position toward the second stable position;

wherein a second input to the input member from the operator moves the pin along the track from the second stable position toward the first stable position; and wherein the activation mechanism is configured such that the input member is moved in the same direction for the first input and the second input.

14. A medical patient support arrangement, comprising:
a platform configured to support a patient;
a chassis attached to the platform;
at least one wheel assembly movably coupled to the chassis, the at least one wheel assembly operable between a first state and a second state different from the first state;
an activation mechanism that controls the movement of the at least one wheel assembly with respect to the chassis, the activation mechanism including a track having a first stable position and a second stable position spaced along a length of the track, the activation mechanism further including a pin configured to travel along the track, wherein the at least one wheel assembly is in the first state when the pin is in the first stable position the at least one wheel assembly is in the second state when the pin is in the second stable position, wherein the first state of the at least one wheel assembly is a raised state and the second state of the at least one wheel assembly is a lowered state, and wherein the movement of the at least one wheel assembly is a vertical movement between the raised and lowered states; and
a movable foot pedal adapted to receive an input from an operator, the foot pedal operably coupled to the activation mechanism to move the pin between the first and second stable positions, wherein the foot pedal partially extends from beneath the chassis and is substantially parallel with a floor surface when the pin is in the first stable position;

wherein a first input to the foot pedal from the operator moves the pin along the track from the first stable position toward the second stable position;

wherein a second input to the foot pedal from the operator moves the pin along the track from the second stable position toward the first stable position; and wherein the foot pedal is configured such that the foot pedal is moved in the same direction for the first input and the second input.

15. The medical patient support arrangement of claim 14, wherein the foot pedal forms an acute angle with a floor surface when the pin is in the second stable position.

16. The medical patient support arrangement of claim 14, wherein the at least one wheel assembly includes a pair of wheel assemblies, and wherein the foot pedal is positioned laterally between the pair of wheel assemblies.

17. The medical patient support arrangement of claim 14, wherein the medical patient support arrangement comprises a chair.

18. The medical patient support arrangement of claim 14, wherein the pin is spring biased into the first stable position.

19. The medical patient support arrangement of claim 18, wherein the pin is spring biased into the second stable position.

20. The medical patient support arrangement of claim 14, wherein the pin travels through a continuous loop.

21. The medical patient support arrangement of claim 20, wherein the track is continuous.

22. The medical patient support arrangement of claim 14, further comprising:
a pair of forward support wheels; and
a pair of rearward support wheels; and
wherein the at least one wheel assembly is located between the forward support wheels and the rearward support wheels.

23. The medical patient support arrangement of claim 14, wherein the at least one wheel assembly is coupled to the chassis to prevent swiveling of the wheel assembly with respect to the chassis.

* * * * *

UNITED STATES PATENT AND TRADEMARK OFFICE
CERTIFICATE OF CORRECTION

PATENT NO. : 9,579,241 B2
APPLICATION NO. : 14/872724
DATED : February 28, 2017
INVENTOR(S) : Spoor et al.

Page 1 of 2

It is certified that error appears in the above-identified patent and that said Letters Patent is hereby corrected as shown below:

In the Specification

Column 1, Line 9:
"Jun. 19, 2015" should be — Jun. 11, 2015, now abandoned —

Column 1, Line 20:
"activations" should be — activation —

Column 1, Line 42:
"required" should be — requiring —

Column 2, Line 63:
"wheel" should be — wheels —

Column 3, Line 52:
"cutaway" should be — cut-away —

Column 3, Line 58:
"cutaway" should be — cut-away —

Column 3, Line 63:
"activating" should be — activation —

Column 5, Line 35:
"there through" should be — therethrough —

Column 8, Line 22:
"222" should be — 322 —

Signed and Sealed this
Eighth Day of October, 2019

Andrei Iancu
*Director of the United States Patent and Trademark Office*

Column 8, Line 46:
"222" should be — 220 —

Column 8, Line 56:
"222" should be — 220 —

In the Claims

Column 10, Claim 10, Line 42:
Delete "and"

Column 10, Claim 13, Line 59:
Delete "and"

Column 11, Claim 13, Line 3:
Delete "and"

Column 11, Claim 14, Line 32:
After "position" insert -- , --

Column 11, Claim 14, Line 39:
Delete "and"

Column 12, Claim 22, Line 34:
Delete "and"